(12) United States Patent
Znamenskiy et al.

(10) Patent No.: US 9,947,112 B2
(45) Date of Patent: Apr. 17, 2018

(54) SCANNING DEVICE AND METHOD FOR POSITIONING A SCANNING DEVICE

(71) Applicant: KONINKLIJKE PHILIPS N.V., Eindhoven (NL)

(72) Inventors: Dmitry Nikolayevich Znamenskiy, Eindhoven (NL); Franciscus Hendrikus Van Heesch, Eindhoven (NL); Ruud Vlutters, Eindhoven (NL); Karl Catharina Van Bree, Eindhoven (NL)

(73) Assignee: KONINKLIJKE PHILIPS N.V., Eindhooven (NL)

( * ) Notice: Subject to any disclaimer, the term of this patent is extended or adjusted under 35 U.S.C. 154(b) by 193 days.

(21) Appl. No.: 14/652,958

(22) PCT Filed: Dec. 11, 2013

(86) PCT No.: PCT/IB2013/060832
§ 371 (c)(1),
(2) Date: Jun. 17, 2015

(87) PCT Pub. No.: WO2014/097060
PCT Pub. Date: Jun. 26, 2014

(65) Prior Publication Data
US 2015/0332459 A1 Nov. 19, 2015

Related U.S. Application Data

(60) Provisional application No. 61/738,594, filed on Dec. 18, 2013, provisional application No. 61/832,289, filed on Jun. 7, 2013.

(51) Int. Cl.
*G06T 7/00* (2017.01)
*G06T 7/80* (2017.01)
(Continued)

(52) U.S. Cl.
CPC ............ *G06T 7/80* (2017.01); *G06K 9/00255* (2013.01); *G06K 9/00912* (2013.01);
(Continued)

(58) Field of Classification Search
CPC ....... G06K 2009/3225; G06K 9/00255; G06K 9/00912; G06K 9/228; G06K 9/3216;
(Continued)

(56) References Cited

U.S. PATENT DOCUMENTS 6,314,311 B1  11/2001  Williams
7,440,590 B1 * 10/2008  Hassebrook ....... G01B 11/2513
                                                  345/582

(Continued)

FOREIGN PATENT DOCUMENTS

JP    2008275392 A    11/2008
WO    WO9965223 A2    12/1999
(Continued)

OTHER PUBLICATIONS

Glossop N.D. et al., "Laser Projection Augmented Reality System for Computer-Assisted Surgery", International Congress Series, Excerpta Medica, Amsterdam, NL, vol. 125 6, Jun. 1, 2003, pp. 65-71, XP027453412.
(Continued)

*Primary Examiner* — Thai Tran
*Assistant Examiner* — Stephen Smith
(74) *Attorney, Agent, or Firm* — Michael W. Haas (57) ABSTRACT

The present invention relates to a scanning device (10, 10') for scanning an object (12), wherein the scanning device (10) comprises a projection unit (16) for projecting an alignment image (28) onto the object (12), said alignment image (28) comprising a main pattern (26), an image capturing unit (18) for capturing a live camera image (30) of the object (12), said live camera image (30) comprising a
(Continued)

derivative pattern (32) of the main pattern (26), the derivative pattern (32) representing said projected alignment image (28) as seen from the image capturing unit viewpoint, and an alignment unit (22, 22') for providing an indication of a correct position and/or orientation of the scanning device (10) with respect to the scanned object (12) on the basis of the captured live camera image (30).

12 Claims, 5 Drawing Sheets (51) Int. Cl.
- G06K 9/00 (2006.01)
- G06K 9/22 (2006.01)
- G06K 9/32 (2006.01)
- G06T 7/73 (2017.01)

(52) U.S. Cl.
CPC .......... *G06K 9/228* (2013.01); *G06K 9/3216* (2013.01); *G06T 7/73* (2017.01); *G06K 2009/3225* (2013.01); *G06T 2207/30201* (2013.01); *G06T 2207/30204* (2013.01); *G06T 2207/30244* (2013.01)

(58) Field of Classification Search
CPC . G06T 2207/30201; G06T 2207/30204; G06T 2207/30244; G06T 7/0018; G06T 7/0042; G06T 7/80
USPC .............. 348/61, 63, 131, 135, 136, 46, 77; 382/117; 600/407, 476
See application file for complete search history.

(56) References Cited

U.S. PATENT DOCUMENTS

| | | | |
|---|---|---|---|
| 8,116,559 B2 | 2/2012 | Knighton | |
| 8,504,136 B1 | 8/2012 | Sun | |
| 8,416,236 B1* | 4/2013 | Hickman | G06T 19/20 345/419 |
| 8,662,676 B1* | 3/2014 | Chang | H04N 17/002 345/158 |
| 9,098,899 B2 | 8/2015 | Waechter-Stehle | |
| 2002/0016541 A1* | 2/2002 | Glossop | A61B 90/10 600/407 |
| 2002/0172415 A1 | 11/2002 | Asano | |
| 2007/0098234 A1 | 5/2007 | Fiala | |
| 2007/0239004 A1* | 10/2007 | Kakee | A61B 8/06 600/437 |
| 2009/0002488 A1* | 1/2009 | Luciano | A61B 5/0059 348/136 |
| 2009/0283598 A1 | 11/2009 | Sherman | |
| 2009/0310832 A1 | 12/2009 | Kim | |
| 2010/0079481 A1 | 4/2010 | Zhang | |
| 2010/0222684 A1 | 9/2010 | Hatzilias | |
| 2011/0002510 A1* | 1/2011 | Hanna | G06K 9/00604 382/117 |
| 2012/0078088 A1* | 3/2012 | Whitestone | A61B 5/0077 600/425 |
| 2012/0230473 A1* | 9/2012 | Stagnitto | A61B 6/4291 378/205 |
| 2012/0274745 A1* | 11/2012 | Russell | H04N 13/025 348/46 |
| 2013/0057652 A1* | 3/2013 | Firth | G01B 11/25 348/46 |
| 2013/0182217 A1* | 7/2013 | Cheng | A61B 3/12 351/206 |
| 2013/0218024 A1* | 8/2013 | Boctor | A61B 8/0841 600/476 |
| 2014/0015963 A1* | 1/2014 | Klaas | G01B 11/254 348/136 |
| 2014/0153816 A1* | 6/2014 | Cohen | G06T 7/0075 382/154 |
| 2014/0160115 A1* | 6/2014 | Keitler | G01B 11/00 345/419 |
| 2014/0247326 A1* | 9/2014 | Hebert | H04N 13/0275 348/46 |

FOREIGN PATENT DOCUMENTS

| | | |
|---|---|---|
| WO | WO2009120073 A2 | 10/2009 |
| WO | WO2011148299 A1 | 12/2011 |
| WO | WO2012160470 A1 | 11/2012 |

OTHER PUBLICATIONS

Salvi Joaquim et al., "Pattern Codification Strategies in Structured Light Systems", 2003 The Journal of the Pattern Recognition Society, Pattern Recognition 37 (2004), Elsevier Ltd. Oct. 2, 2003, www.elsevierComputerScience.com.

Bundesministerium Der Justiz: "Handbuch der Rechtsförmlichkeit. Teil B: Allgemeine Empfehlungen für das Formulieren von Rechtsvorschriften; 1: Sprachliche Gestaltung von Gesetzen and Rechtsverordnungen", Handbuch Der Rechtsförmlichkeit, Bundesanzeiger Verlag, pp. 1-38, Jan. 2008 (Jan. 1, 2008), XP002686041.

\* cited by examiner

FIG. 9

SCANNING DEVICE AND METHOD FOR POSITIONING A SCANNING DEVICE

CROSS-REFERENCE TO RELATED APPLICATIONS

This patent application claims the priority benefit under 35 U.S.C. § 371 of International Patent Application No. PCT/IB2013/060832, filed Dec. 12, 2013, which claims the priority benefit under 35 U.S.C. § 119(e) of U.S. Provisional Application No. 61/738,594 filed on Dec. 18, 2012, and U.S. Provisional Application No. 61/832,289 filed on Jun. 7, 2013, the contents of which are herein incorporated by reference.

FIELD OF THE INVENTION

The present invention relates to a scanning device for scanning an object, in particular for scanning a 3D surface of the object.

Furthermore, the present invention relates to a method for positioning the scanning device with respect to an object to be scanned.

BACKGROUND OF THE INVENTION

Scanning devices usually utilize an image sensor to collect light reflected from an object to generate an image of the object. The image sensor converts the light energy into an electrical charge and finally to a set of bits representing the color and intensity of the light. The resulting digital image is for example a two-dimensional image of a relatively flat object such as paper, which is, for example, placed on a flat bed scanner.

3D scanning is a technique of converting the geometrical shape or form of an object into a data set of points. Each point may represent an actual point, in three-dimensional space, of the surface of the object that was scanned. The collected data can be used to construct digital, three-dimensional models. The collected 3D data is useful for a wide variety of applications. For example, the 3D scanning technology is extensively used by the entertainment industry in the production of movies and videogames. Other common applications of this technology include industrial design, orthotics and prosthetics, reverse engineering and prototyping, quality control/inspection and documentation of cultural artifacts.

In particular, 3D data of human faces can be collected. The captured facial contour and geometry can be used to design masks, which are applied in many medical fields including CPAP (constant positive air pressure). The exact 3D modeling of the facial contour eases the manufacturing of well fitting masks avoiding the problem of air leaks, which can cause eye irritations.

There are many different technologies that can be used to build a 3D scanning device. One well known classification divides the scanning technology into two types: contact and non-contact 3D scanning.

Contact 3D scanners probe the object through physical touch, while the object is in contact with or resting on a precision flat surface plate. This type of scanning technology is mostly used in manufacturing and can be very precise. The disadvantage of contact scanning is that it requires contact with the object being scanned. Thus, the object might be modified or damaged during the scanning process. Moreover, this scanning technology is usually very slow compared to other scanning methods. In addition, it is not desirable to use such a 3D contact scanner for scanning the facial contour of a human face.

Another popular class of 3D scanning techniques is active non-contact scanning. Active means that the respective scanner emits some kind of encoded, structured or non-encoded energy, such as light, and detects the reflection of said energy at the scanned object in order to probe the object and to capture a corresponding 3D representation.

Active non-contact type 3D scanners are most frequently based on the use of triangulation. In this case, the scanner for example directs a laser beam on the object and uses a camera to look for the location of the laser dot. Depending on how far away the laser strikes a surface of the object, the laser dot appears at different places in the camera's field of view. The underlying technology is called triangulation because the laser dot, the camera and the laser emitter form a triangle.

Instead of a single laser dot, a pattern of light can be projected on the object. This type of scanner is called structured light scanner and can be regarded as an active non-contact scanner. The pattern may be a one-dimensional pattern like a line or a two-dimensional pattern like a grid or a line stripe pattern. The light pattern is projected onto the object using for example an LCD projector. A camera, offset slightly from the pattern projector, captures the structured light as seen from a camera viewpoint. Further, the captured image is analyzed and the pattern distortions are evaluated. By means of an algorithm based on the triangulation, the distance to each point of the pattern is calculated. By sweeping the light pattern across the surface of the object, a 3D representation of the object can be achieved. Structured light 3D scanners provide very fast scans. Instead of scanning one point or line at a time, structured light scanners can scan multiple points or lines or the entire field of view at once.

However, in order to acquire proper scans, the scanner should be located at a certain distance and/or angle from the object. For a proper alignment of the scanner it is well-known, for example, to use a static aim pattern, which contains markers that need to be aligned with face features by moving and rotating the hand-held scanner. As an example, the eyes of the patient's face need to be aligned with projected circles, while a cross needs to be aligned with the nose tip. This alignment procedures, however, only provides quite inaccurate results and has been found not intuitive enough for sleep technicians that use such scanners. Additionally, if the object and the scanner can freely move (for example scanning of a person's head without chin support by means of a handheld scanner), the user might have difficulties in evaluating the proper scan position. Therefore, some form of feedback or assistance is required for correctly positioning the scanning device with respect to the object to be scanned.

SUMMARY OF THE INVENTION

Accordingly, it is an object of the present invention to provide a scanning device and a method that assist the user in finding the correct position and/or orientation of the scanning device with respect to the scanned object.

In a first aspect of the present invention, a scanning device for scanning an object is presented, which comprises a projection unit for projecting an alignment image onto the object, said alignment image comprising a main pattern, an image capturing unit for capturing a live camera image of the object, said live camera image comprising a derivative pattern of the main pattern, the derivative pattern representing said projected alignment image as seen from the image capturing unit viewpoint, and an alignment unit for providing an indication of a correct position and/or orientation of the scanning device with respect to the scanned object on the basis of the captured live camera image.

In a further aspect of the present invention, a method for positioning a scanning device with respect to an object to be scanned is presented, wherein the method comprises projecting an alignment image onto the object, said alignment image comprising a main pattern, capturing a live camera image of the object, said live camera image comprising a derivative pattern of the main pattern, the derivative pattern representing said projected alignment image as seen from an image capturing viewpoint, providing an indication of a correct position and/or orientation of the scanning device with respect to the scanned object on the basis of the captured live camera image, and changing the position and/or orientation of the scanning device on the basis of the provided indication such that the scanning device substantially takes up the correct position and/or orientation when repeating the previous steps.

The projection unit of the scanning device can, for example, be an LCD projector or any other stable light source that is able to project the alignment image comprising the main pattern onto the object. Typically, a charged coupled device or a CMOS sensor is used as the image capturing unit for capturing the live camera image. Since the scanning device is based on the structured light principle, the projection unit projects a pattern of light onto the object and evaluates the deformation of said pattern on the object in order to achieve a 3D representation of the scanned object. In order to acquire precise scans and to make sure the object to be scanned is within the scanner's operating range, the position and/or orientation of the scanning device has to be aligned in respect to the object, i.e. the scanning device has to be positioned at a certain distance/angle range from the object. The user can very easily align the position and/or orientation by just moving the scanning device relatively to the object based on the provided indication. For providing the indication the scanning device may evaluate the captured live camera image and may determine a possible misalignment of the scanning device based on said evaluation. In this case, the indication comprises information about the determined misalignment. Alternatively, it is up to the operator of the scanning device to evaluate the deviation of the scanning device from the correct position and/or orientation based on the indication, wherein the scanning device does not assess the alignment of the scanning device prior to providing the indication. Due to the low complexity the proposed alignment of the scanning device can be carried out very fast.

Preferred embodiments of the invention are defined in the dependent claims.

In a first embodiment, the projection unit is configured to project a static main pattern, wherein the alignment unit is a superposition unit configured to update the alignment image by superimposing the captured live camera image and the static main pattern, said updated alignment image indicating the correct position and/or orientation of the scanning device with respect to the scanned object if the static main pattern and the derivative pattern substantially coincide in the updated alignment image. In other words, the user of the scanner intuitively understands that the scanning device is aligned properly, as soon as the static main pattern and the derivative pattern substantially coincide in the updated alignment image. In this embodiment, it is not necessary to implement complex algorithms in the scanning device in order to evaluate the correct alignment of the scanning device. In comparison to automatic alignment procedures, which can for example fail due to facial hairs and motion of the scanner or the object causing blurred camera images, the proposed manual alignment of the scanning device using the subconscious visual feedback of the user constitutes a very robust solution.

In a further embodiment, the projection unit is configured to project a main pattern comprising a basic pattern, wherein the correct position and/or orientation is a correct distance of the scanning device with respect to the scanned object. The basic pattern can comprise, for example, a circle and two lines that intersect at the center of the circle. The image capturing unit, which is slightly offset from the projection unit, captures said basic pattern from the image capturing unit viewpoint. If the static main pattern and the derivative pattern do not coincide in the updated alignment image, the distance to the object is not correctly set. Consequently, the user has to move the scanning device closer to or farther away from the object. By means of the superimposed patterns, the distance of the scanning device to the object to be scanned can be aligned very fast and in an easy, intuitive and more robust manner.

In a further embodiment, the projection unit is configured to project a main pattern comprising the basic pattern and a supplementary pattern, wherein the correct position and/or orientation is a correct angle of the scanning device with respect to the object. Besides the basic pattern, the main pattern can also comprise the supplementary pattern, which is constituted, for example, by two additional lines being arranged on two different sides outside the circle of the basic pattern. The main pattern, as specified in this embodiment, facilitates an alignment of the distance and/or angle of the scanning device with respect to the scanned object. So, the user also might have to rotate the scanning device relatively to the object, if the static main pattern and the derivative pattern do not coincide in the updated alignment image. The visual feedback of the static main pattern and the derivative pattern comprised by the alignment image leads to a fast, easy, intuitive and more robust alignment of the angular position of the scanning device.

In another embodiment, the scanning device further comprises a processing unit for processing the captured live camera image and configured to provide the processed live camera image to the superposition unit. By means of the processing unit, the live camera image can be adapted before it is superimposed by the main pattern. This leads to an improved quality of the updated alignment image and consequently facilitates a more precise alignment of the scanning device in regard to the object.

In a further embodiment, the processing unit is configured to zoom the live camera image. The zoom functionality can be used to match the aspect ratio of the image capturing unit and the projection unit. Since the processing unit may be used to synchronize the graphical properties of the projection unit and the image capturing unit, a very flexible combination of the projection unit and the image capturing unit is achieved. Furthermore, the quality of the superposition of the static main pattern and the live camera image is improved, thereby facilitating a more precise alignment of the scanning device. Alternatively, the zooming ratio can be further increased to improve the sensitivity of the visual feedback and to reduce texture ghosting.

In another embodiment, the processing unit is configured to transform the live camera image such that the main pattern and the derivative pattern substantially coincide in the updated alignment image when the scanning device is aligned properly to a calibration object. In this embodiment, the scanning device provides the option to first align the scanning device with respect to a calibration object. For this calibration object, the proper distance and angle is known by the user. That means, the static main pattern and the derivative pattern should theoretically coincide in the updated alignment image, if the scanning device is positioned at the known distance and angle. If said patterns do not coincide, then the processing unit is programmed to transform the live camera image such that the main pattern and the derivative pattern finally coincide in the updated alignment image. The found transformation is stored and applied in the visual feedback loop. This measure improves the visual feedback.

In a further embodiment, the superposition unit is configured to apply a different brightness and/or color to the captured live camera image than to the main pattern. The different brightness and/or color allow to more easily distinguish the main pattern and the derivative pattern. As a result, the user can more precisely align the scanning device.

In another embodiment, the superposition unit is configured to repeatedly update the alignment image by repeatedly superimposing the continuously captured live camera image and the main pattern. In this embodiment, the user gets a continuous visual feedback when changing the position and/or orientation of the scanning device. Therefore, this measure speeds up the alignment of the scanning device.

In a further embodiment, the scanning device is configured to suppress or avoid ghost patterns in the updated alignment image. When repeatedly updating the alignment image by repeatedly superimposing the continuously captured live camera image and the main pattern, the updated alignment image may comprise many ghost patterns resulting from the closed loop composed of the projection unit, the image capturing unit and the superposition unit. While the ghost patterns might not perceive disturbing since said patterns all deviate in the same direction, and may even support the user during the fine tuning of the alignment, the ghost patterns can be effectively suppressed or even avoided in some embodiments.

In another embodiment, the superposition unit is configured to suppress the ghost patterns by enhancing a contrast of the live camera image to segment the derivative pattern from a background of the live camera image and by normalizing a brightness of the live camera image such that the brightness is a predetermined fraction lower than the brightness of the main pattern. Due to these measures, the alignment image substantially comprises only the static main pattern and the derivative pattern, which in this embodiment is just constituted by the main pattern as seen from the image capturing unit perspective. Ghost patterns and other image content that is irrelevant to the projected patterns (double ghost noses/eyes etc.) are suppressed. As a consequence, the focus of the user is just set to these two patterns.

In a further embodiment, the image capturing unit is configured to avoid the ghost patterns by synchronizing the image capturing unit and the projection unit such that the derivative pattern and the captured live camera image is only constituted by the main pattern as seen from the image capturing unit viewpoint. If the static main pattern is known by the image capturing unit, the image capturing unit is enabled to acquire images that only contain the main pattern as seen from the image capturing unit perspective. Therefore, ghost patterns can be effectively avoided by this measure.

In a further embodiment, the projection unit is configured to project the updated configuration image using a first color channel for the main pattern and using a second color channel for the derivative pattern, wherein the image capturing unit is configured to capture the live camera image using at least the first color channel. In this embodiment, advantageously a color projection unit and a color image capturing unit are used. By projecting and acquiring the main pattern and the derivative pattern using different color channels, the generation of potentially confusing ghost patterns can be avoided.

In another embodiment, the scanning device is configured to determine 3D data representing a 3D geometry of at least a part of the object. The 3D scanner analyzes the object to collect data on its shape and possibly its appearance (for example the color). The collected 3D data can be used to construct digital, three dimensional models. The 3D data are useful for a wide variety of applications. By way of example, they can be used by the entertainment industry in the production of movies and video games. Other common applications include industrial design, orthotics and prosthetics, reverse engineering and prototyping, quality control/inspection and documentation of cultural artifacts.

In a further embodiment, the scanning device comprises an interface for transferring said 3D data to a data storage unit. In one embodiment, the data storage unit is located right next to the scanning device or can even be integrated in the scanning device. In another embodiment, the data storage unit is remotely located, for example, at a manufacturing site, where the 3D data are used to manufacture a product.

For instance, the object may be a face of a person. The 3D data of the person's face can, for example, be used to manufacture an individualized mask for the person, for instance a patient interface for medical treatments or any other type of masks for other applications, like e.g. the production of movies.

In a preferred embodiment of the inventive method, a static main pattern is projected onto the object, wherein the steps of providing the indication and changing the position and/or orientation comprise the steps of updating the alignment image by superimposing the captured live camera image and the static main pattern, projecting the updated alignment image onto the object, and changing the position and/or orientation of the scanning device such that the static main pattern and the derivative pattern substantially coincide in the updated alignment image. This embodiment provides an intuitive approach for aligning the scanning device with respect to the object and requires therefore no specific training of the personnel using the scanner.

In another embodiment, the method further comprises aligning the scanning device such that a center of the main pattern is pointing to a center of the object. The center of the main pattern can, for example, be the circle of the basic pattern. The center of this circle can then be aligned such that the center is pointing to the center of the object, which can be, by way of example, a nose of a scanned person. This supports the precise alignment of the scanning distance and the scanning angle.

In another embodiment, the method further comprises aligning the scanning device such that a vertical symmetry axis of the main pattern coincides with a vertical symmetry axis of the object. The vertical symmetry axis of the object can, for instance, be a vertical centerline of a human face including the nose bridge. This pattern supports the user during the alignment process and eases the correct positioning of the scanning device.

In an even further aspect of the present invention, the projection unit of the scanning device is configured to project a main pattern comprising a marker pattern, wherein the alignment unit comprises a calculation unit for determining a depth value of the projected marker pattern on the basis of the captured live-camera image, the depth value representing a distance between a position of the projected marker pattern and the scanning device, and for calculating an alignment error of the scanning device on the basis of the determined depth value, the alignment error representing a deviation of the actual positioning of the scanning device from the correct position and/or orientation of the scanning device, the indication of the correct position and/or orientation of the scanning device being based on the alignment error. In this embodiment the scanning device is configured to continuously provide a feedback on the alignment error. This ensures a very fast and precise alignment of the scanning device with respect to the object.

In a further embodiment of the scanning device, the alignment unit comprises a detection unit for determining the position of the projected marker pattern. By means of the detection unit the marker pattern can be identified very quickly. As a consequence, the alignment error and the indication, respectively, can be provided without any substantial delay. This, in turn, leads to a fast and convenient alignment of the scanning device.

In another embodiment of the scanning device, the alignment unit comprises a presentation unit for presenting the indication of the correct position and/or orientation of the scanning device to an operator of the scanning device. By means of the direct feedback provided from the scanning device, the user, for example a sleep technician, can directly react to a positional misalignment of the scanning device. This assures a correct alignment of the scanner and consequently leads to a precise scan of e.g. a patient's face.

In a further embodiment of the scanning device, the presentation unit is configured to present an indication of the correct position and/or orientation of the scanning device that comprises an amount and/or direction of the alignment error. In this embodiment, the user of the scanning device receives an exact information about the direction and amount of the alignment error. Since the user of the scanning device exactly knows how the scanner has to be moved and/or rotated with respect to the object, the alignment procedure can be accelerated.

In another embodiment of the scanning device, the presentation unit comprises an overlay unit for updating the alignment image by overlaying the main pattern and an image comprising the indication of the correct position and/or orientation of the scanning device. The visualization provides a very intuitive approach for indicating the alignment error. So, the alignment error can be projected, for example, on a forehead region of a person's face. That means, the feedback with respect to the correct position and/or orientation of the scanning device is presented directly in the field of view of the user operating the scanning device. This leads to a more user friendly and easier alignment procedure. Moreover, no additional hardware is needed for displaying the alignment error.

In a further embodiment of the scanning device, the presentation unit comprises a visual display unit for displaying an image comprising the indication of the correct position and/or orientation of the scanning device. In this embodiment a separate unit is used for presenting the information about the alignment error. This external display unit can be positioned at any distance from the user operating the scanning device. Further, the information can be presented in any format and, for example, can be zoomed according to the needs of the operator. Also, additional text can be provided on the visual display unit that advises the user how the scanning device has to be moved and/or turned with respect to the object.

According to another embodiment of the scanning device, the presentation unit comprises an acoustic unit for acoustically providing an information comprising the indication of the correct position and/or orientation of the scanning device. The acoustic unit can comprise, for example, a loudspeaker that acoustically provides an information for guiding the operator of the scanning device through the alignment procedure. This acoustical information can be provided alternatively or additionally to a visual presentation of the alignment error.

In another embodiment of the scanning device, the projection unit is configured to project a marker pattern comprising a spatially and/or temporally coded pattern. Such a coded pattern eases the detection of the projected marker pattern, thereby leading to a faster alignment procedure.

According to another embodiment of the scanning device, the projection unit is configured to project a main pattern comprising a static element pattern. The static element pattern can comprise, for example, two circles and/or a cross that need to be aligned with eyes and/or a nose tip of a person's face in the beginning of the alignment procedure. The application of the static element pattern provides a coarse initial alignment of the scanning device. Consequently, the indication of the alignment error is only needed for a fine tuning of the position and/or orientation of the scanning device. As a result, the alignment procedure can be accelerated.

According to an even further aspect of the inventive method, a main pattern comprising a marker pattern is projected onto the object, wherein the step of providing the indication comprises determining a depth value of the projected marker pattern on the basis of the captured live-camera image, the depth value representing a distance between a position of the projected marker pattern and the scanning device, calculating an alignment error of the scanning device on the basis of the determined depth value, the alignment error representing a deviation of the actual positioning of the scanning device from the correct position and/or orientation of the scanning device, and providing the indication of the correct position and/or orientation of the scanning device based on the alignment error. The proposed method improves the alignment procedures by continuously providing direct feedback on the alignment error to an operator of the scanning device. This feedback can be added to a projected pattern or given through another modality, such as a separate screen or an acoustical unit. By means of the presented alignment error, the operator of the scanning device is intuitively guided through the alignment procedure. As a consequence, the scanner can be very quickly and precisely aligned to the object.

According to another embodiment the method further comprises determining the position of the projected marker pattern prior to the determination of the depth value. First, the projected marker pattern has to be identified in the capture live-camera image. As soon as the position of this marker is determined, the depth value of this marker is continuously estimated by means of the 3D scanner. On the basis of the depth estimate the alignment error of the scanning device is computed and provided to the operator of the scanner. Advantageously, the main pattern comprises a plurality of marker patterns that are projected onto the object. This eases the calculation of the alignment error.

It shall be understood that the claimed method has similar and/or identical preferred embodiments as the claimed device and as defined in the dependent claims.

BRIEF DESCRIPTION OF THE DRAWINGS

These and other aspects of the invention will be apparent from and elucidated with reference to the embodiments described hereinafter. In the following drawings

DETAILED DESCRIPTION OF THE INVENTION

Figure 1:
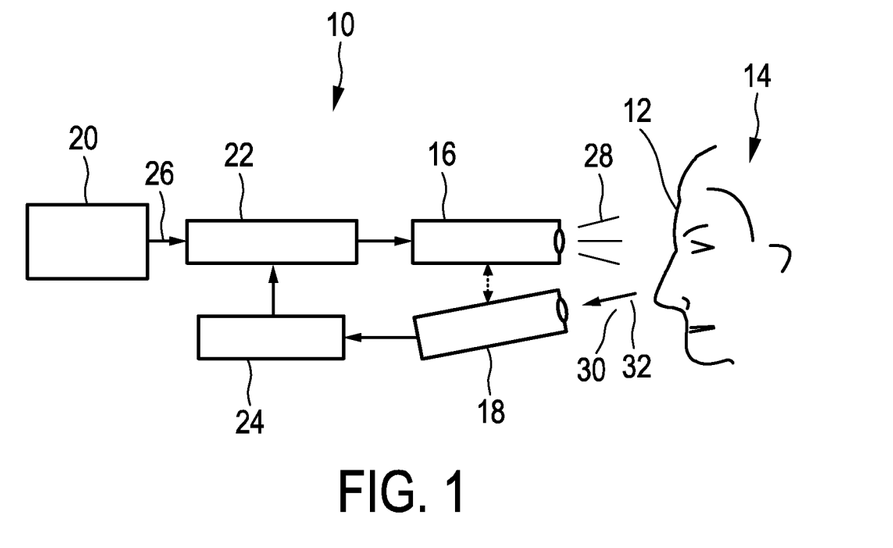
FIG. 1 shows a preferred embodiment of a scanning device for scanning an object.

FIG. 1 shows a scanning device 10 for scanning, by way of example, a face 12 of a person 14. In this exemplary embodiment, the scanning device 10 is a handheld 3D scanner that is configured to scan the facial surface of the face 12 in order to generate a 3D representation of the face 12. The 3D representation can e.g. be used for manufacturing facial masks applied during medical treatments. For achieving this 3D representation, the scanner 10 has to measure the distance between the scanner 10 and the facial surface of the face 12. This is typically done by applying the known triangulation mechanisms.

The scanner 10 comprises a projection unit 16 and an image capturing unit 18 and is based on the structured light principle. The projection unit 16 is, for instance, an LCD/DMD projector 16. The image capturing unit 18 is a camera 18, typically a charged coupled or CMOS device. The structured light handheld 3D scanner 10 projects a pattern of light onto the face 12 by means of the projector 16. In order to generate a 3D representation of the face 12, the scanner 10 evaluates the deformation of said pattern, which is captured by means of the camera 18. As can be seen in FIG. 1, the camera 18 is slightly offset from the pattern projector 16. Since the camera 18 looks on the projected pattern from a different angle as the projector 16, said pattern appears at different places in the camera's 18 field of view depending on the distance between the scanner 10 and a surficial point of the face 12. This technique is called triangulation. By calculating the distance between the scanner 10 and each surficial point of the face 12, a 3D representation of the face 12 can be achieved.

From this described approach, it is evident that the alignment of the scanner 10 in respect to the face 12 is a crucial issue. In order to acquire accurate scans, the scanner 10 has to be positioned at a certain distance and angle from the face 12. For supporting this alignment process, the scanner 10 comprises a pattern generator 20, a superposition unit 22 and a processing unit 24. The pattern generator 20 generates a static main pattern 26, which is provided to the projector 16 via the superposition unit 22. The projection unit 16 projects an alignment image 28 comprising said static main pattern 26 onto the face 12. Then, the camera 18 captures a live camera image 30 of the face 12, wherein the live camera image 30 comprises the projected alignment image 28 as seen from a viewpoint of the camera 18. As a consequence, the live camera image 30 comprises a derivative pattern 32, which is a pattern that is derived from the static main pattern 26.

The captured live camera image 30 is then provided to the processing unit 24, which, for example, zooms the live camera image 30 to improve the sensitivity of the visual feedback. In a further step, the processed live camera image 30 is provided to the superposition unit 22. The superposition unit 22 generates an updated alignment image 28 by superimposing the processed live camera image 30 and the static main pattern 26. This updated alignment image 28 is again projected onto the face 12 by means of the projector 16. As a result of the superposition carried out by the superposition unit 22, the updated alignment image 28 comprises the static main pattern 26 and the derivative pattern 32. As an option, the superposition unit 22 may apply different brightness levels and/or colors to the static main pattern 26 and to the derivative pattern 32. Thus, the user can very easily distinguish said patterns 26, 32 in the projected alignment image 28. Advantageously, the derivative pattern 32 appears less bright in the updated alignment image 28 such that the user intuitively recognizes the static main pattern 26 and the derivative pattern 32.

In a preferred embodiment of the scanner 10, the sequence of projecting the alignment image 28, capturing the live camera image 30, generating the updated alignment image 28 by superimposing the captured live camera image 30 and the static main pattern 26 and again projecting the updated alignment image 28 is continuously repeated. This assures a precise alignment of the scanner 10 in respect of the face 12.

Figure 2A:
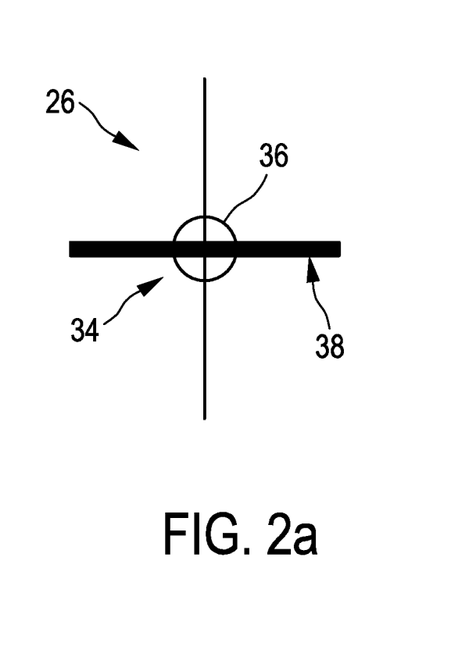
FIG. 2 shows different embodiments of a static main pattern comprised by an alignment image, which is projected onto the object by the scanning device.

FIG. 2a shows an exemplary embodiment of the static main pattern 26 comprising a basic pattern 34. The basic pattern 34 is constituted by a circle 36 and a cross pattern 38. Preferably, the user aligns the scanner 10 such that a center of the circle 36 is pointing to a center of the face 12 (for example a nose of the scanned person 14). Furthermore, the user aligns the scanner 10 vertically such that a vertical symmetry axis of the cross pattern 38 coincides with a vertical symmetry axis of the face 12 (for instance a centerline of the face 12 comprising a nose bridge of the person 14). As will be apparent from the following examples, the static main pattern 26 of FIG. 2a facilitates a correct alignment of the scanner 10 with respect to a distance between the scanner 10 and the face 12. However, the static main pattern 26 of FIG. 2a is not suitable for calibrating the orientation of the scanner 10 relatively to the face 12.

Figure 2B:
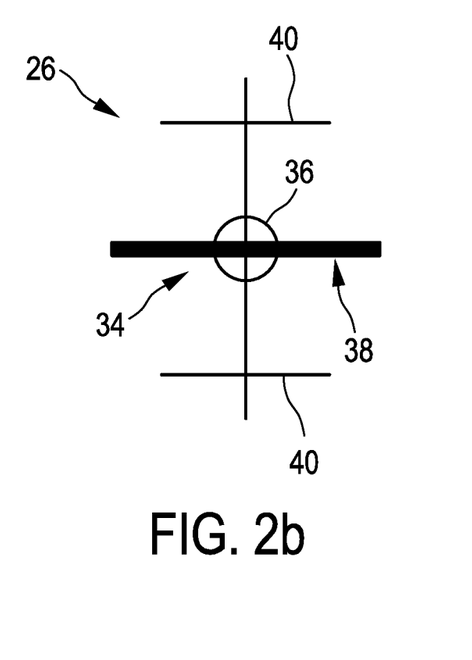

FIG. 2b illustrates a static main pattern 26 that comprises the basic pattern 34 and a supplementary pattern 40, which allows the alignment of a vertical angle of the scanner 10 with respect to the face 12. In this example, it is assumed that the projector 16 and the camera 18 are vertically arranged to each other. The vertical angle of the scanner 10 can be aligned by inspecting both the top and bottom part of the supplementary pattern 40.

FIGS. 3 to 6 show various alignment images 28 for different misalignments of the scanner 10 in regard to the face 12. For all succeeding alignment images 28, it is assumed that the projector 16 is vertically arranged above the camera 18. In general, the scanner 10 is correctly positioned and/or orientated relatively to the face 12, if the static main pattern 26 and the derivative pattern 32 substantially coincide in the updated alignment image 28, which is projected on the face 12. If said two patterns 26, 32 do not coincide in the alignment image 28, the user has to adjust the scanning distance and/or the angle of the scanner 10 relatively to the face 12 until the main pattern 26 and the derivative pattern 32 approximately coincide. By means of FIGS. 3 to 6, it is explained how the user is supposed to interpret the observed patterns 26, 32 of the alignment image 28.

Figure 3A:
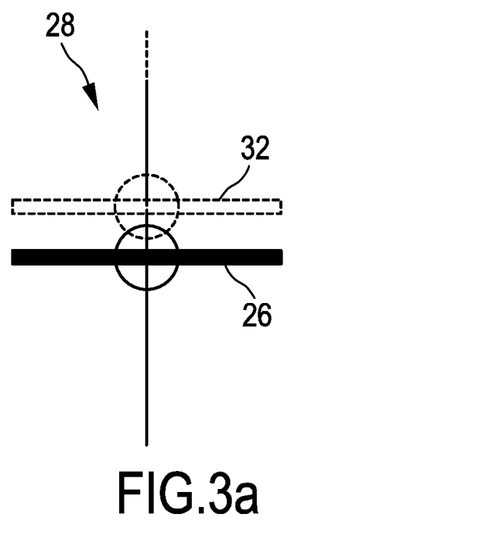
FIGS. 3 to 6 show various alignment images for different misalignments of the scanning device.

In FIGS. 3 to 5, the static main pattern 26 is illustrated by continuous lines, whereas the derivative pattern 32 is illustrated by dashed lines.

FIG. 3 shows an example of the alignment image 28, where the scanner 10 is positioned too close to the face 12. Consequently, the user has to move the scanner 10 farther away in order to correctly align the distance of the scanner 10.

Figure 3B:
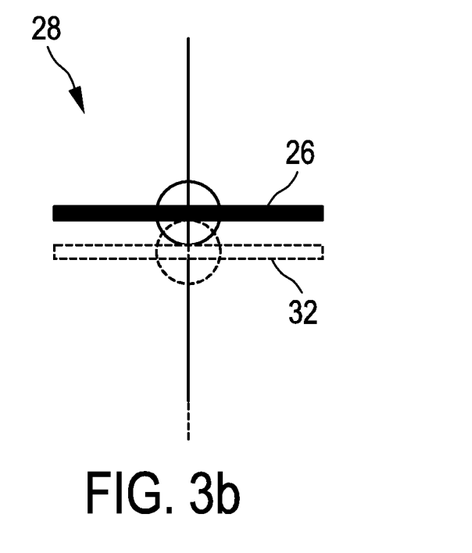

FIG. 3b illustrates the opposite example, where the scanner 10 is positioned too far from the face 12. As a result, the scanner 10 has to be moved closer to the face 12.

FIGS. 4 and 5 show different alignment images 28, wherein the static main pattern 26 comprises the basic pattern 34 and the supplementary pattern 40, which additionally facilitate the tracking of the correct orientation of the scanner 10.

Figure 4A:
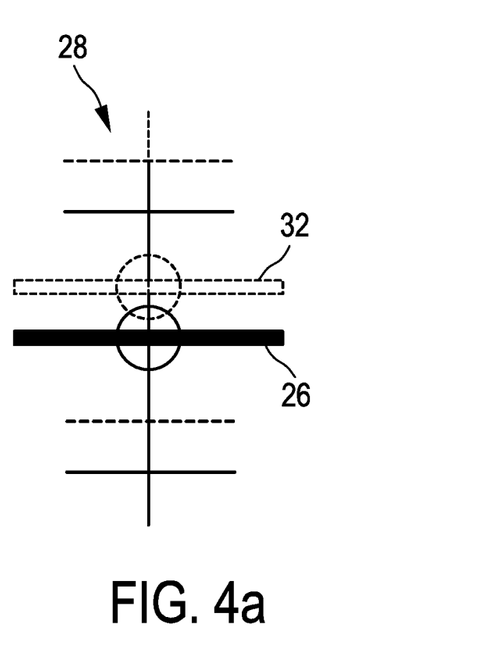
Figure 4B:
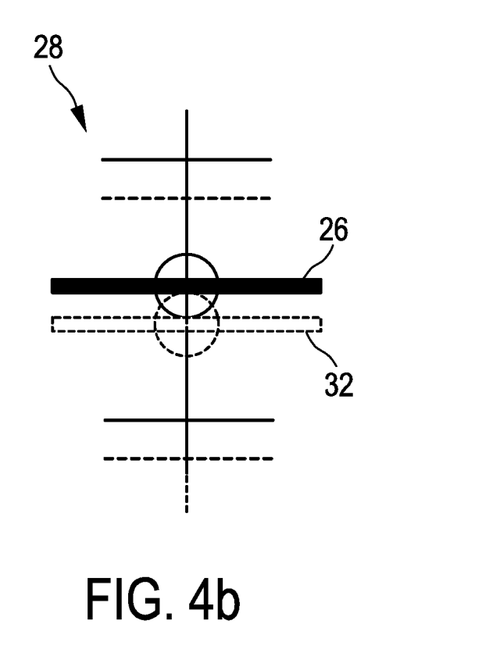

In FIG. 4a, the scanner 10 is positioned too close to the face 12, so it has to be moved farther away. FIG. 4b illustrates the opposite example of the one shown in FIG. 4a. So, the scanner 10 is positioned too far from the face 12. Therefore, the scanner 10 has to be moved closer to the face 12.

Figure 5A:
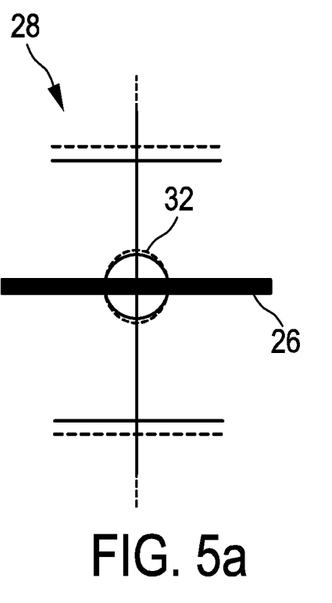
Figure 5B:
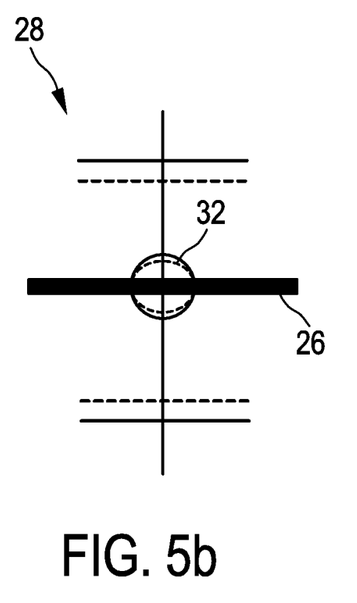
Figure 6A:
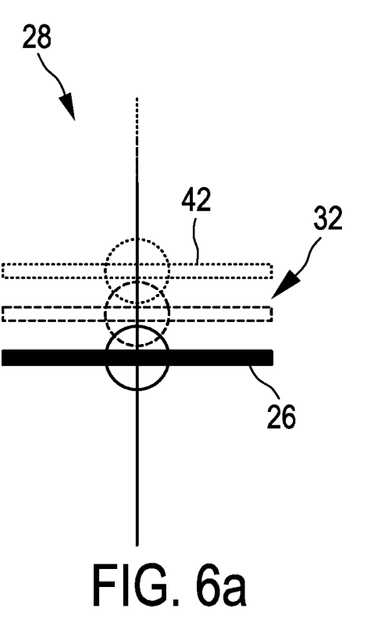
Figure 6B:
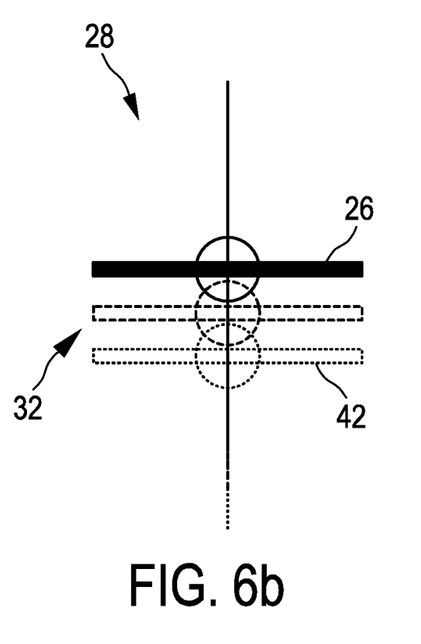

FIG. 5 illustrates two examples of the scanning device 10 being misaligned to the face 12 in respect to the orientation (angle) between the scanner 10 and the face 12. In FIG. 5a, the camera 18 is closer to the face 12 than the projector 16. That means the scanner 10 is looking upwards relatively to the face 12. Therefore, the user has to rotate down the scanner 10. In the example illustrated in FIG. 5b, the camera 18 is farther away from the face 12 than the projector 16. Since the scanner 10 is basically looking downwards, the user has to rotate it up.

This aligning procedure presumes that the scanner 10 is correctly prealigned in the sense that the main pattern 26 and the derivative pattern 32 substantially coincide, if the correct position and/or orientation of the scanning device 10 with respect to the scanned object 12 is established. A prealignment, for example, can be performed by properly aligning the scanner 10 relatively to a calibration object 12, where the correct position and/or orientation of the scanning device 10 is already known in advance. If the static main pattern 26 and the derivative pattern 32 do not coincide in the alignment image 28 for the properly aligned scanning device 10, then the processing unit 24 can be programmed to search for such image transformation that the main pattern 26 and the derivative pattern 32 coincide in the alignment image 28. In particular, the processing unit 24 can (linearly) transform the captured live camera image 30 until the accurate coverage of the main pattern 26 and the derivative pattern 32 is assured. By means of this prealignment of the scanner 10, precise alignments of the scanner 10 with respect to the face 12 can be achieved.

As a result of the loop composed of the projector 16, the camera 18, the processing unit 24 and the superposition unit 22 (see also FIG. 1), the alignment image 28 may comprise many ghost patterns 42. In FIG. 1 only one ghost pattern 42 is illustrated for the sake of conciseness (see dotted line in FIG. 6).

While the ghost patterns 42 might not perceived disturbing and may even support the user during the fine alignment of the scanner 10 (since all the ghost patterns 42 deviate in the same direction in regard to the main pattern 26), they can be effectively suppressed or even avoided in the alignment image 28. There are several options how to suppress or even avoid the ghost patterns 42.

In one embodiment, the live camera image 30 is contrast enhanced in order to segment the observed derivative pattern 32 (possibly comprising several ghost patterns 42) from the background and to reduce texture ghosting. Further, the brightness of the live camera image 30 is normalized such that it is a specified fraction lower than the brightness of the main pattern 26. These steps will also reduce the image ghosting.

In an alternative embodiment, the camera 18 is synchronized with the projector 16 such that the camera 18 only acquires live camera images 30 that only comprise the main pattern 26. As a result, the projector 16 projects an alignment image 28 that only comprises the main pattern 26 and the derivative pattern 32, which in turn only comprises the main pattern 26 as seen from the camera 18 perspective. During the synchronization procedure between the projector 16 and the camera 18, the shape of the main pattern 26 may be provided to the camera 18. This enables the camera 18 to automatically detect and capture only the main pattern 26.

In a further embodiment, a color camera and a color projector are used for the camera 18 and the projector 16. Consequently, the main pattern 26 and the observed derivative pattern 32 can be projected and acquired using different color channels. In particular, the projector 16 can use a first color channel for the main pattern 26 and a second color channel for the derivative pattern 32 when projecting the updated configuration image 28 onto the face 12. If the camera 18 uses, for example, the first color channel for capturing the live camera image 30, the live camera image 30 only comprises the main pattern 26 as seen from the camera perspective. As a result, ghost patterns 42 can be effectively avoided.

Figure 7:
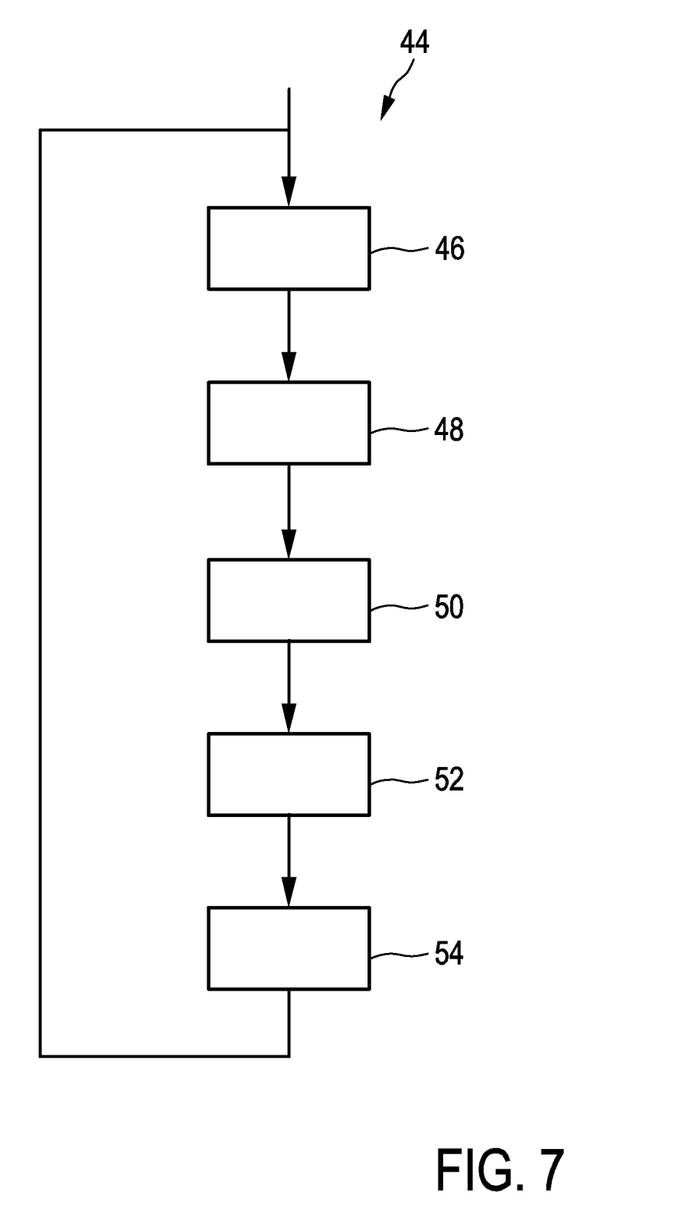
FIG. 7 shows a diagram for illustrating a preferred embodiment of a method for positioning the scanning device with respect to the object.

FIG. 7 shows a diagram for illustrating a preferred embodiment of a method 44 for positioning the scanning device 10 with respect to the object 12.

In a first step 46, the alignment image 28 is projected onto the object 12, wherein the alignment image 28 comprises the static main pattern 26.

In a step 48, the scanning device 10 is aligned with respect to the object 12. The alignment procedure comprises positioning the scanning device 10 such that a center of the main pattern 26 is pointing to a center of the object 12. Furthermore, the scanning device 10 should be positioned such that a vertical symmetry axis of the main pattern 26 coincides with a vertical symmetry axis of the object 12.

In a step 50, the live camera image 30 of the object 12 is captured, wherein said live camera image 30 comprises the projected alignment image 28 as seen from an image capturing viewpoint. Therefore, the live camera image 30 comprises the derivative pattern 32, which in turn is composed of the static main pattern 26 as seen from the image capturing viewpoint.

In a step 52, the live camera image 30 is processed. In one exemplary embodiment, the live camera image 30, for example, can be zoomed to match the aspect ratio of the camera 18 and the projector 16. In another embodiment the zooming ratio can be further increased to improve the sensitivity of the visual feedback and to reduce texture ghosting.

In a step 54, the alignment image 28 is updated by superimposing the captured live camera image 30 and the static main pattern 26. Optionally, different brightnesses and/or colors can be applied to the live camera image 30 and the static main pattern 26. This eases the differentiation of the derivative pattern 32 and the static main pattern 26 within the alignment image 28.

In a next step, the updated alignment image 28 is projected onto the object 12, thereby returning again to the step 46.

If the static main pattern 26 and the derivative pattern 32 do not coincide in the updated alignment image 28, then the user again has to align the scanner 10 with respect to the object 12 in a further iteration of the step 48. Thus, the alignment step 48 may also comprise changing a position and/or orientation of the scanning device 10 with respect to the scanned object 12.

The steps 46 to 54 are repeated until the static main pattern 26 and the derivative pattern 32 substantially coincide in the updated alignment image 28. If this status is achieved, the scanner 10 is correctly aligned to the object 12. As a consequence, precise scans of the object 12 can be acquired. Further, it is ensured that the object to be scanned is within the scanner's operating range.

In summary, FIGS. 1 to 7 describe a scanning device 10 for scanning an object 12, wherein the scanning device 10 comprises a projection unit 16 for projecting an alignment image 28 onto the object 12, said alignment image 28 comprising a static main pattern 26, an image capturing unit 18 for capturing a live camera image 30 of the object 12, said live-camera image 30 comprising a derivative pattern 32 of the static main pattern 26, the derivative pattern 32 representing said projected alignment image 28 as seen from the image capturing unit 18 viewpoint, and a super-position unit 22 for updating the alignment image 28 by superimposing the captured live-camera image 30 and the static main pattern 26, said updated alignment image 28 indicating a correct position and/or orientation of the scanning device 10 with respect to the scanned object 12, if the static main pattern 26 and the derivative pattern 32 substantially coincide in the updated alignment image 28.

Further, FIGS. 1 to 7 relate to a method for positioning a scanning device 10 with respect to an object 12 to be scanned, wherein the method comprises projecting an alignment image 28 onto the object 12, said alignment image 28 comprising a static main pattern 26, capturing a live-camera image 30 of the object 12, said live-camera image 30 comprising a derivative pattern 32 of the static main pattern 26, the derivative pattern 32 representing said projected alignment image 28 as seen from an image capturing viewpoint, updating the alignment image 28 by superimposing the captured live-camera image 30 and the static main pattern 26, projecting the updated alignment image 28 onto the object 12, and changing the position and/or orientation of the scanning device 10 such that the static main pattern 26 and the derivative pattern 32 substantially coincide in the updated alignment image 28 when repeating the previous steps.

Figure 8:
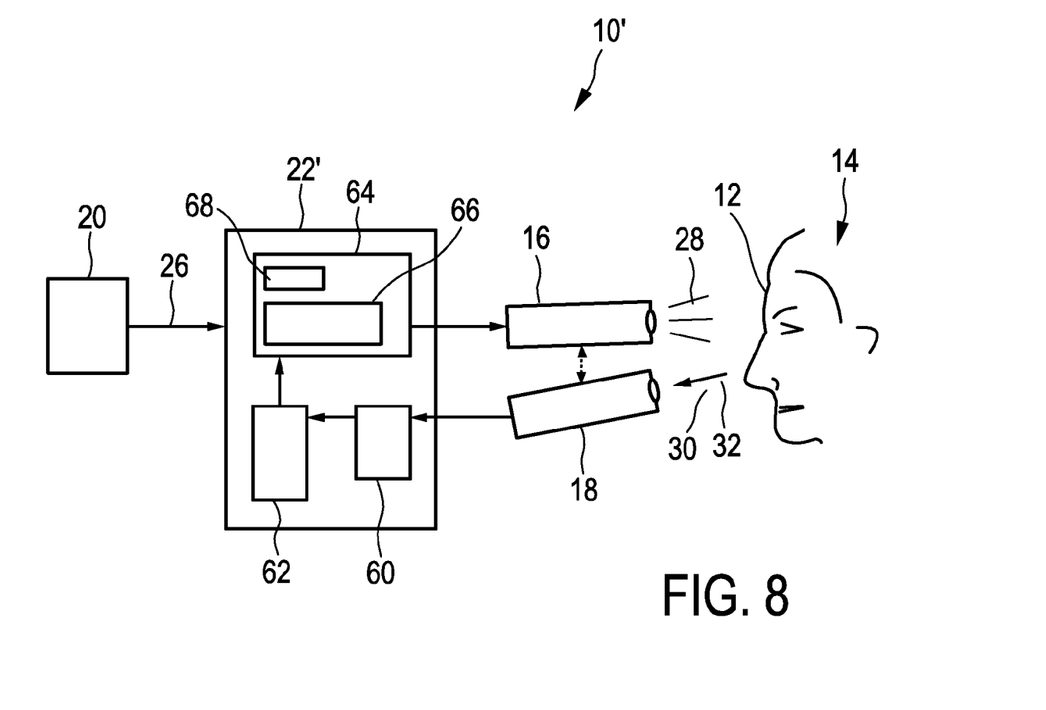
FIG. 8 shows another preferred embodiment of the scanning device for scanning an object according to a further aspect of the present invention.

According to a further aspect of the present invention FIG. 8 illustrates another embodiment of the scanning device 10' for scanning an object 12. In general, the scanning device 10' corresponds to the embodiment of the scanning device 10 shown in FIG. 1. Corresponding units/elements are therefore tagged by the same numerals. In the following, only the differences are explained.

As shown in FIG. 8, the scanning device 10' comprises an alignment unit 22' that is coupled to the pattern generator 20, the projection unit 16 and the camera 18. The alignment unit 22' comprises a detection unit 60, a calculation unit 62 and a presentation unit 64. In the illustrated exemplary embodiment of the scanning device 10', the presentation unit 64 comprises an overlay unit 66 and an acoustic unit 68. In an alternative embodiment, the presentation unit 64 can either comprise the overlay unit 66 or the acoustic unit 68. In an even further alternative embodiment of the scanning device 10', the presentation unit 64 can also be arranged outside of the scanning device 10' and can comprise, for example, an external visual display unit, like e.g. a tablet PC that is connected to the calculation unit 62 by means of a wireless communication.

In the following, the functionality of the alignment unit 22' will be explained in combination with FIGS. 8 and 9. In this embodiment of the scanning device 10', the pattern generator 20 generates a main pattern 26, which comprises a static element pattern 70 and a plurality of marker patterns 72. The main pattern 26 is provided to the alignment unit 22', which forwards the main pattern 26 to the projection unit 16. As in the embodiment shown in FIG. 1, the projection unit 16 projects the alignment image 28 onto the person's face 12, wherein the alignment image 28 comprises the main pattern 26. The static element pattern 70 may comprise elliptical shaped patterns 70a that can be aligned at the eyes and the face 12, respectively, of the person 14. Additionally, the static element pattern 70 can comprise a cross 70b that needs to be focused on to a nose tip of the person 14 during the alignment procedure of the scanning device 10'. By aiming the static element pattern 70 at the various facial features of the person 14 a coarse initial alignment of the scanning device 10' is performed. As a consequence, the alignment of the scanner 10' is accelerated.

The following steps of the alignment process provide a fine-tuning of the position and/or orientation of the scanning device 10'. In the exemplary embodiment of the main pattern 26 illustrated in FIG. 9, the marker patterns 72 comprise a spatially coded pattern, in particular an AR-tag (augmented reality tag) composed of a 2D binary code. Alternatively, other types of codes can be used, such as a temporally coded pattern (for example temporal alternating blocks). In a further alternative embodiment of the main pattern 26 both spatially and temporally coded patterns are used as the marker patterns 72. The spatially and/or temporally coded patterns are applied to assure that the marker patterns 72 can be easily detected in a later step of the alignment process.

As in the embodiment of the scanning device 10, the camera 18 captures the live-camera image 30 comprising the derivative pattern 32 of the main pattern 26. Since the derivative pattern 32 represents the projected alignment image 28 as seen from the camera viewpoint, the derivative pattern 32 comprises also derived patterns from the static element pattern 70 and the marker patterns 72. The captured live-camera image 30 is then forwarded to the detection unit 60. The detection unit 60 is used to determine the exact positions of the marker patterns 72. The search for the marker patterns 72 is eased by the fact that the approximate position of the marker patterns 72 is known a priori. Therefore, the exact position of the marker patterns 72 can be found fast by, for example, correlating a sliding window in a search window when using a spatially coded pattern as a marker pattern 72. Analogously, a temporal filter can be applied when using temporally coded patterns as marker patterns 72. Once the exact positions of the marker patterns 72 have been determined/estimated, this position information is forwarded to the calculation unit 62.

The determined positions of the marker patterns 72 directly translate to respective depth values. This transformation can be performed by applying, for example, a look-up table. From the depth estimates (relating to the positions of the marker patterns 72) a model is derived that allows a conclusion to be drawn about the position and/or orientation of the face 12 with respect to the scanning device 10'. A simple model, for example, estimates the orientation along a vertical axis of the face 12 by determining the depth value trend of the marker patterns 72a, 72c and 72b illustrated in FIG. 9. Similarly, the orientation along a horizontal axis of the face 12 is derived from the trend of the depth values of the marker patterns 72d, 72c and 72e. The correct distance between the scanning device 10' and the face 12 is either derived from the depth value of the middle marker pattern 72c or the average of all depth values relating to the marker patterns 72a to 72e. In summary, the alignment error of the scanning device 10' with respect to the face 12 can be calculated from the depth estimates relating to the marker patterns 72. This alignment error is forwarded to the presentation unit 64.

The presentation unit 64 is responsible for presenting an indication 74 of the correct position and/or orientation of the scanning device 10' to an operator of the scanning device 10', wherein the indication 74 is derived from the alignment error. The indication 74 can be visually and/or acoustically provided to the operator. In the embodiment illustrated in FIG. 8, the alignment error is forwarded to the overlay unit 66 as well as to the acoustic unit 68. The overlay unit 66 updates the alignment image 28 by overlaying the main pattern 26 and an image comprising the indication 74, which represents a visualization of the alignment error. Referring to the example illustrated in FIG. 9, the indication 74 may comprise two arrows (see left and right arrow of the indication 74 in FIG. 9) that indicate how the scanning device 10' has to be rotated with respect to the face 12, and may comprise one additional arrow (see arrow in the middle of the indication 74 in FIG. 9) that guides the user with respect to the correct distance between the scanning device 10' and the person's face 12. For the visualization of the current alignment error, the indication 74 is projected onto the face 12, preferably on the forehead region of the face 12, since the forehead region is typically relatively flat.

Alternatively, or additionally to the three arrows illustrated in the indication 74, the indication 74 may comprise error scales that visualize the amount of the alignment error. Further, also a gimbal can be visualized as part of the indication 74.

The acoustic unit 68 processes the alignment error for an acoustic rendering and forwards this processed information to a loudspeaker. The processed information may comprise an acoustic indication 74 like e.g. "turn to the left", "turn to the right", "move closer" and/or "move farther away".

The scanning device 10' is able to continuously measure the depth values of the marker patterns 72 and to provide to the operator of the scanning device 10' a continuous feedback on the current alignment error. The alignment error is visually and/or acoustically presented to the scanner operator. The indication 74 based on the alignment error assures a intuitive handling of the scanning device 10' during the alignment procedure. Further, the provided indication 74 leads to a very fast and precise alignment of the scanner 10' with respect to an object 12. By indicating the amount and/or direction of the alignment error the operator of the scanner 10' is guided on how the scanner 10' needs to be rotated and/or moved in order to quickly reduce the current alignment error.

The scanning device 10' also facilitates an easy and comfortable calibration of the scanning device 10', wherein a (non-linear) conversion from the scanner internal units to "real world" coordinates (for example in a coordinate system in which the scanning device 10' is positioned) is determined. An essential tool in such a calibration process is an appropriate calibration template. The calibration template can be, for example, a calibration chart that is a perfectly flat board with markers that comprise a known spacing. For calibration, the scanning device 10' is positioned at a number of different distances and/or angles with respect to the calibration board, wherein the scanning device 10' is projecting patterns on the calibration board. Since the calibration procedure usually allows a certain degree of freedom with respect to the positioning of the scanning device 10', it is sufficient to position the scanning device 10' at approximate distances and/or angles. This positioning is supported by the scanning device 10' by providing the indication 74 that indicates the correct position of the scanning device 10' with respect to the calibration board. Thus the proposed scanning device 10' enables also inexperienced users to perform a scanner calibration. Additional special equipment, like e.g. a laptop, is not needed.

Figure 9:
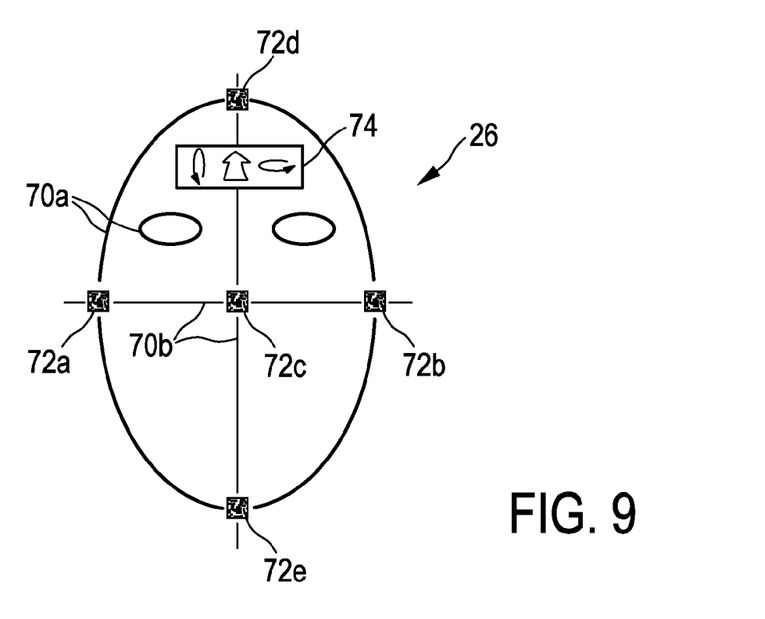
FIG. 9 shows an exemplary main pattern including an indication of the correct position and/or orientation of the scanning device according to a further aspect of the present invention.

According to a further aspect of the present invention, FIGS. 8 and 9 disclose a scanning device 10' for scanning an object 12, wherein the scanning device 10' comprises a projection unit 16 for projecting an alignment image 28 onto the object 12, said alignment image 28 comprising a main pattern 26, an image capturing unit 18 for capturing a live-camera image 30 of the object 12, said live-camera image 30 comprising a derivative pattern 32 of the main pattern 26, the derivative pattern 32 representing said projected alignment image 28 as seen from the image capturing unit 18 viewpoint, and an alignment unit 22' for providing an indication of a correct position and/or orientation of the scanning device 10' with respect to the scanned object 12 on the basis of the captured live-camera image 30, wherein the projection unit 16 is configured to project a main pattern 26 comprising a marker pattern 72 and wherein the alignment unit 22' comprises a calculation unit 62 for determining a depth value of the projected marker pattern 72 on the basis of the capture live-camera image 30, the depth value representing a distance between a position of the projected marker pattern 72 and the scanning device 10', and for calculating an alignment error of the scanning device 10' on the basis of the determined depth value, the alignment error representing a deviation of the actual positioning of the scanning device 10' from the correct position and/or orientation of the scanning device 10', the indication 74 of the correct position and/or orientation of the scanning device 10' being based on the alignment error.

In addition, according to another aspect of the present invention, FIGS. 8 and 9 relate to a method for positioning a scanning device 10' with respect to an object 12 to be scanned, wherein the method comprises projecting an alignment image 28 onto the object 12, said alignment image 28 comprising a main pattern 28, capturing a live-camera image of the object 12, said live-camera image 30 comprising a derivative pattern 32 of the main pattern 26, the derivative pattern 32 representing said projected alignment image 28 as seen from an image capturing viewpoint, providing an indication of a correct position and/or orientation of the scanning device 10' with respect to the scanned object 12 on the basis of the captured live-camera image 30, and changing the position and/or orientation of the scanning device 10' on the basis of the provided indication, such that the scanning device 10' substantially takes up the correct position and/or orientation when repeating the previous steps, wherein a main pattern 26 comprising a marker pattern 72 is projected onto the object 12, and wherein the step of providing the indication 74 comprises the steps of determining a depth value of the projected marker pattern 72 on the basis of the captured live-camera image 30, the depth value representing a distance between a position of the projected marker pattern 72 and the scanning device 10', calculating an alignment error of the scanning device 10' on the basis of the determined depth value, the alignment error representing a deviation of the actual positioning of the scanning device 10' from the correct position and/or orientation of the scanning device 10', and providing the indication 74 of the correct position and/or orientation of the scanning device 10' based on the alignment error.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In particular, the disclosed scanning device and method can also be applied in any other application such as, by way of example, the production of movies and videogames, quality control, reverse engineering or prototyping. Throughout this application the term "coincide" is in general to be read as "substantially coincide". The derivative pattern will in most cases comprise a natural deformation with respect to the main pattern due to, for example, deviations of the exact 3D head geometries of the scanned subjects from the 3D shape of the calibration object.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. Scanning device for scanning an object, comprising:
   a projection unit for projecting an alignment image onto the object, said alignment image comprising a main pattern;
   an image capturing unit for capturing a live camera image of the object, said live camera image comprising a derivative pattern of the main pattern, the derivative pattern being derived from said main pattern and representing said projected alignment image as seen from the image capturing unit viewpoint;
   a process for processing the captured live camera image, the processor having an alignment unit for providing an indication of a correct position and/or orientation of the scanning device with respect to the scanned object on the basis of the captured live camera image,
   wherein the projection unit is configured to project a static main pattern, and
   wherein the alignment unit is a superposition unit configured to update the alignment image by superimposing the captured live camera image and the static main pattern, said updated alignment image indicating the correct position and/or orientation of the scanning device with respect to the scanned object, if the static main pattern and the derivative pattern substantially coincide in the updated alignment image.

2. Scanning device according to claim 1, wherein the projection unit is configured to project a main pattern comprising a basic pattern and wherein the correct position and/or orientation is a correct distance of the scanning device with respect to the scanned object.

3. Scanning device according to claim 1, wherein the processor is configured to zoom the live camera image.

4. Scanning device according to claim 1, wherein the processor is configured to transform the live camera image such that the main pattern and the derivative pattern substantially coincide in the updated alignment image when the scanning device is aligned properly to a calibration object.

5. Scanning device according to claim 1, wherein the superposition unit is configured to apply a different brightness and/or color to the captured live camera image than to the main pattern.

6. Scanning device according to claim 1, wherein the superposition unit is configured to repeatedly update the alignment image by repeatedly superimposing the continuously captured live camera image and the main pattern.

7. Scanning device according to claim 1, wherein the projection unit is configured to project a main pattern comprising a marker pattern and wherein the alignment unit comprises a calculation unit for
   determining a depth value of the projected marker pattern on the basis of the captured live camera image, the depth value representing a distance between a position of the projected marker pattern and the scanning device, and
   calculating an alignment error of the scanning device on the basis of the determined depth value, the alignment error representing a deviation of the actual positioning of the scanning device from the correct position and/or orientation of the scanning device, the indication of the correct position and/or orientation of the scanning device being based on the alignment error.

8. Scanning device according to claim 7, wherein the alignment unit comprises a presentation unit for presenting the indication of the correct position and/or orientation of the scanning device to an operator of the scanning device.

9. Scanning device according to claim 8, wherein the presentation unit is configured to present an indication of the correct position and/or orientation of the scanning device that comprises an amount and/or direction of the alignment error.

10. Scanning device according to claim 8, wherein the presentation unit comprises an overlay unit for updating the alignment image by overlaying the main pattern and an image comprising the indication of the correct position and/or orientation of the scanning device.

11. Scanning device according to claim 8, wherein the presentation unit comprises a visual display unit for displaying an image comprising the indication of the correct position and/or orientation of the scanning device, and/or an acoustic unit for acoustically providing an information comprising the indication of the correct position and/or orientation of the scanning device.

12. Scanning device according to claim 7, wherein the projection unit is configured to project a marker pattern comprising a spatially and/or temporally coded pattern.

* * * * *